United States Patent Office 3,535,522
Patented Oct. 20, 1970

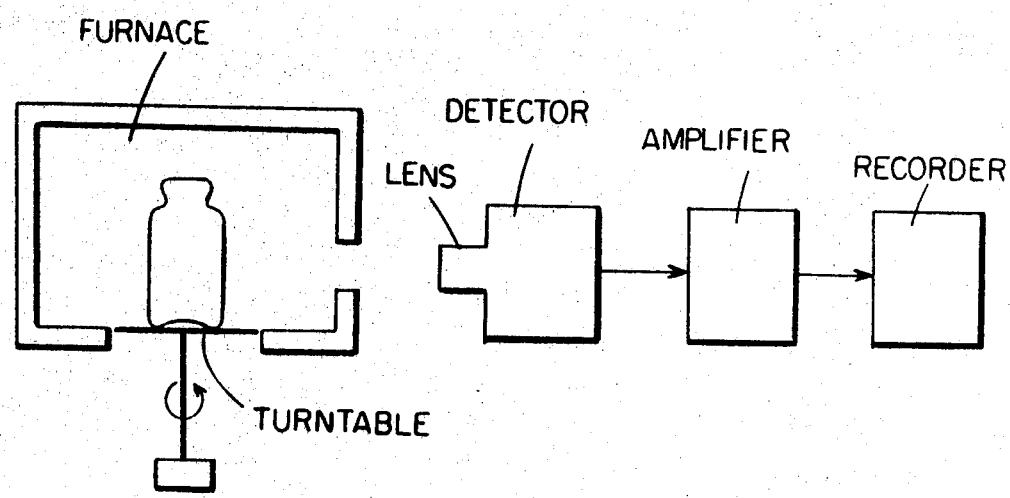

3,535,522
PROCESS AND APPARATUS FOR MONITORING THICKNESS OF SHAPED TRANSPARENT ITEMS
Edward Hart Green, Cleveland, Ohio, assignor to Glass Container Industry Research, New Castle, Pa., a corporation of Ohio
Filed Dec. 22, 1966, Ser. No. 604,073
Int. Cl. G01j 5/04, 5/16
U.S. Cl. 250—83.3                                    3 Claims

ABSTRACT OF THE DISCLOSURE

Process and apparatus for monitoring thickness of a shaped transparent item. The intensity of electromagnetic radiation emitted from the item is correlated with the thickness of the item while the item is maintained at substantially constant temperature.

---

This invention relates to a non-destructive process for the measurement of the thickness of transparent bodies, and to apparatus for accomplishing such measurement.

In the prior art it is known to measure the wall thickness of transparent objects by physically contacting the item to be measured or by use of auxiliary facilities such as external light source, heat sinks, and the like.

While the present invention is applicable to a great variety of transparent objects made from a great variety of materials, in its preferred application, it is used for the measurement of the thickness of glass objects, most preferably the wall thickness and/or uniformity of hollow glass objects. In the manufacture of hollow glass objects control of the wall thickness and/or uniformity is an important factor. Such dimensional characteristics are important not only for creating glass objects of appealing appearance, but also considerations of strength, accurate dimensioning, requirements for good annealing, minimizing of the cost of glass used, etc., make the control of wall thickness and uniformity of major importance.

The dimensional characteristics of hollow glass objects are determined in accordance with the prior art only after the object has been annealed and cooled, and even then usually by breaking and calipering at the broken edges. Hollow glass objects are generally formed on high speed production machinery, whereafter the molded object is subjected to an annealing treatment of prolonged duration. By the time an annealed and cooled object becomes available for inspection to determine whether any adjustment of molding machinery is required, many hundreds, thousands, or hundreds of thousands of glass articles may have been molded, depending on the production rate of the machinery. Similarly, the effect of making any adjustment on the machinery cannot be determined until considerably later, by which time a substantial quantity of possibly useless glass articles may have been molded. Even if one were to omit annealing, and cool a glass object from a point in the process prior to its entry into the annealing lehr, a great number of other articles will have been molded during the time required for cooling the object to a temperature where it can be handled.

It is a feature of the invention to provide a nondestructive method for determining the thickness of transparent objects, such as hot glass containers, without the use of internal probes or other devices that might occasion internal contamination, and without the use of contacting members which might occasion damage to the object being measured. It is a further feature that the method of the invention requires only a short time to be carried out, and gives immediate results.

The term "transparent" as used throughout the specification and the claims encompasses both clear and colored transparent objects, as well as translucent objects, so long as they are not completely opaque.

The term "glass containers," or like expressions employed herein, denotes hollow glass containers, as well as flat, solid or hollow objects of transparent material with or without a pattern thereon. Consequently, smooth surfaces as well as pebbled, wavy or rippled surfaces are included in the aforementioned term.

In accordance with a feature of the process of the invention, the thickness of shaped transparent items can be monitored by detecting the electromagnetic radiation within a pre-selected wavelength range emitted by the item at a given point or area on the surface of the item, and measuring the intensity of the detected radiation.

A direct relation exists between electromagnetic radiation emitted by the object and wall thickness. An object can emit electromagnetic radiation under a number of circumstances, such as the radiation emitted by a hot object, by an object containing radioactive matter dispersed therein, etc. It is within the contemplation of the process of the invention to encompass within its broadest aspects the measurement of thickness by sensing radiation of any measurable wavelength and of any perceptible intensity. In the preferred embodiment of the invention radiation, more preferably infrared radiation, of a hot body is measured. The temperature of the body can be as low as will result in the emission of perceptible radiation, but in the preferred method of the invention the radiating object should be at least 400° F. and below 1000° F. temperature. The upper temperature limit is determined only by practical considerations, such as in the case of a glass body where the upper temperature should in most cases be below that at which deformation of the body can occur. The condition under which a transparent object emits perceptible radiation is hereinafter referred to as the "perceptible radiation temperature," however it is to be understood that equivalent values such as concentration of a component, such as of a radioactive material of given emissivity, in the object to be measured is intended to be included within the scope of the aforementioned term. The term includes any condition from a point where perceptible radiation is emitted by the object to a point above which the radiation-exciting condition, such as temperature, causes physical or chemical damage, such as deformation or decomposition, of the object to be measured.

Since the intensity of the emitted radiation decreases as a hot body is cooling and the intensity of the emitted radiation is a function of the temperature of a radiating body, it is inconvenient to attempt to measure the wall thickness of a hot body while in the process of cooling at a rapid rate. Lasser rates of cooling interfere with measurement to a lesser extent, and can be taken into account in determining wall thickness. In accordance with the preferred process of the invention the hot body, the thickness of which is to be measured, is placed into an environment having approximately the same temperature, such as a furnace, and its temperature is held substantially constant during the measurement. Thus an item such as a glass bottle may be placed in a furnace heated to about the temperature of the bottle. The furnace or other environment may desirably be provided with an observation port of shield through which the bottle may be observed. The wall of the bottle emits an approximately constant level of energy substantially proportionate to its mass, and when a fixed target area of the bottle surface is considered the intensity of the radiation is proportionate to the wall thickness of the item.

While the process of the invention is eminently suited for the measurement of thickness of a radiating transparent object, it is particularly useful for determining thickness variations in a transparent hollow vessel, such as a glass container throughout a circumferential portion thereof. Determinations of this nature can be carried out conveniently by placing a glass container being at least at the perceptible radiation temperature into a soaking or equilibrating furnace which is provided with a turntable and an observation port. A radiation detector such as an infrared optical sensing device, for instance an optical pyrometer, bolometer, or thermopile, can be aimed through the observation port onto the glass vessel in the furnace. The constant temperature in the furnace will provide a horizontal base line representing equal thickness or equal emissivity on a plot of emissivity as a function of temperature. Since thickness is proportionate to emissivity, a measure of relative thickness can be obtained. A large range of wavelength domains of more or less intense radiation can be utilized for the process of the present invention. Presence in the atmosphere between the radiating body and the detector of carbon dioxide, water vapor, or other components which might have interfering absorption bands, will result only in small drops in the radiation, the effect of which drops can be further minimized by selection of detectors having maximum sensitivity in the particular wavelength range to be selected for measurement. The problems which might be theoretically presented by the presence of infrared absorbing components in the atmosphere between the radiating body and the detector are also minimized by the fact that smoke and steam (i.e., sensible particles of water) create such broad band interference in which all wavelengths are absorbed or scattered, therefore they are not of importance in determining an optimum wavelength range for use in connection with the measurement.

Preferably the radiation measurement is carried out between 2 and 4.1 microns. Most preferably the absorption charateristics of the atmosphere, water vapor, and carbon dioxide can be taken into consideration, in which case the wavelength ranges are between 2.06 and 2.5 microns, or between 3.56 and 4.06 microns. Limiting the wavelength range can be simply accomplished by the use of appropriate filters for the radiation detector.

In carrying out the measurements of the process of the invention, the detector is focused onto the surface of the radiating body. This is especially important in the measurement of transparent objects, to avoid the detection of radiation from background areas such as from the walls of the equilibrating furnace or from walls of the container disposed opposite to the wall intended to be measured. Optimum focusing can be accomplished by fixing the focal point at the front surface of the radiating specimen, which faces the detector.

Radiations reflected by the radiating body, such as from adjacent furnace portions, can be minimized to an insignificant value by providing a black coating, such as of colloidal graphite, over the exposed interior walls of the soaking or equilibrating furnace.

If the surface of the body to be measured is not smooth, but contains a three-dimensional decoration such as fluted, pebbled, reticulated, or rilled repetitive pattern, the readout plot of the process of the present invention will contain a low order of magnitude ripple superimposed on the trace representing wall thickness variations. The amplitude of the ripple is considerably smaller than the amplitude of the readout trace of the process of the invention, and is therefore of negligible effect.

In accordance with a preferred embodiment of the process of the invention, the object, such as a bottle or a jar, is removed from the production line at a point between the molding operation and where the product is stacked into an annealing lehr. The hot bottle is placed into a furnace of approximately equal temperature, the cross-sectional configuration of which may desirably correspond to the cross-sectional configuration of the bottle. For instance, if the bottle to be measured is of a circular cross-section, the soaking furnace is preferably also of a circular cross-section to create uniform temperature conditions for the specimen container. The furnace preferably has an internal liner or muffle between the heating source and the internal chamber of the furnace. In order to carry out the preferred embodiment of the process of the invention, it is preferred that a turntable be provided for the container to be measured, permitting rotation of the container within the furnace. At least one observation porthole is provided in the furnace wall for detection of radiation emitted by the surface area of the container being in line with the porthole. The radiation emitted by the container through the viewing port is observed by an optical radiation detector, such as a bolometer, pyrometer, thermopile, single crystal detector, etc. The signal generated by the detector, or any variation or modulation of a constant signal occasioned by the detector, depending on the nature of the detector, is measured or plotted after any necessary amplification or electrical modification as may be required. For instance, advantageously a bolometer can be employed wherein the detected signal, which is proportionate to the detected radiation, is amplified and transmitted to a recorder. The recorder may be a fixed drive recorder with variable recording facility along one axis. In this case, the fixed recorder chart drive can be coupled with the rotation of the container turntable, so that chart graduations in the fixed rate chart drive direction can correspond to specific circumferential points of the container as it is rotated. The amplified signal from the detector can be used to drive a recording pen to thus provide a plot of radiation intensity vs. circumferential location of detected radiation.

Obviously alternative detecting and sensing arrangements can also be used in accordance with the invention, for instance, the sample can be scanned helically. Instead of a fixed drive, an X–Y recorder can be employed. In accordance with an alternative embodiment of the invention, rotation of the sample can be omitted in which case the signals of a plurality of detectors aimed at different circumferential portions of the container can be measured or plotted. Alternatively, the difference of signal strength of a plurality of detectors aimed at different surface points can be plotted, thereby obtaining a measure of the difference in wall thickness. Vertical scanning can also be employed to determine vertical thickness distribution. If desired, meter readings or chart plots can be obtained on charts calibrated in direct thickness units; alternatively calibration tables may be used to obtain thickness values, or thickness variations can be detected or expressed in arbitrary units which are proportionate to thickness. Specific modifications and embodiments of the process of the invention can be devised by those skilled in the art, by use of routine experimentation in order to suit the particular purpose for which the process of the invention is to be employed. For instance, the process of the invention can be utilized to provide a primary monitoring signal source for a completely automated system whereby objects coming for molding operations can be continually or intermittently checked in fixed or traveling monitoring locations, and the signal or variations in the detected signals can be used to automatically regulate the operation of molding equipment, furnace conditions, batch mixing, or batch feeding, and the like. On a somewhat lesser scale of operation, the process of the invention can be employed in fixed or traveling detection locations for automatically selecting and rejecting off-quality products.

The invention accordingly comprises the several steps and the relation of one or more of such steps with respect to each of the others thereof, which will be exemplified in the process hereinafter disclosed.

EXAMPLE

A muffle furnace having a thermostatically controlled temperature range from 70° F.–2000° F. sold by the Thermolyne Corporation under the trade designation Temco Electric Muffle Furnace is equipped with a 3 r.p.m. rotating table to provide complete 360° scanning, and with an internal steel linear wrapped with heating coils and separated from the outer shell by loose powdered asbestos. In order to maintain a stable high temperature condition within the furnace, an external shell of thick wall transite pipe is used. A single observation port is provided to permit viewing of the interior of the furnace.

A radiation thermometer sold by Ircon, Inc. under the trade designation Ircon No. 300 T-3 is aligned with the observation port. The turntable which forms part of the bottom of the furnace is connected by a vertically projecting shaft connected from a small gear motor through an electrically actuated clutch. Turntable motor drive and recording chart drive power is controlled with a single switch. The turntable-rotating shaft consists of a shank portion and a tube portion telescopingly slidable over the shank portion, permitting the raising and lowering of the turntable and the loading of the furnace with a specimen to be measured.

The output of the signal amplifier of the radiation detector is connected to a servo recorder sold by the Heath Company under the trade designation EUW-20A.

Samples are obtained from the product conveyor connecting a glass bottle blowing machine with an annealing lehr. The amber-colored bottle sample is placed on the raised turntable and lowered into the interior of the soaking furnace. After a brief period for reaching temperature equilibrium of 700° F. within the furnace, the turntable and chart drives are turned on. The circumferential location vs. radiation plot charted by the recorder is then compared to measurements made with a micrometer after the sample bottle is annealed. A comparison of the values obtained by the process of the present invention, when compared with measurements of identical circumferential locations wtih a micrometer, after plotted, is found to give a better than 95% correlation.

Since certain changes may be made in carrying out the above process and in the apparatus without departing from the scope of the invention, it is intended that all matter contained in the above description shall be interpreted as illustrative and not in a limiting sense.

Having described my invention, what I claim as new and desired to secure by Letters Patent is:

1. In apparatus for monitoring the wall thickness of glass containers while they are in a heated condition at which the containers emit electromagnetic radiation of a preselected wave length, said apparatus including:
    means for detecting the intensity of radiation emitted from the glass containers
    means for focusing said detecting means on fixed target areas of the walls of said containers, and
    means for correlating the detected radiation intensity with the wall thickness of the glass container for monitoring variations in the container wall thickness from said predetermined value, the improvement of a soaking furnace for receiving the glass containers during monitoring, said furnace having an observation port through which radiation emitted by the glass containers can be detected and means therewith for maintaining the glass containers at a heated condition of substantially constant temperature within the range of about 400° F. to 1000° F. whereby the containers emit electromagnetic radiation of a preselected wave length wherefrom.

2. The apparatus of claim 1 wherein the cross-sectional configuration of said furnace corresponds generally with that of the glass containers being monitored.

3. The apparatus of claim 1 wherein the interior surfaces of said soaking furnace are coated with colloidal graphite to minimize radiation reflection from said surfaces.

References Cited

UNITED STATES PATENTS

| | | | |
|---|---|---|---|
| 3,352,156 | 11/1967 | Beitz | 73—355 |
| 3,356,212 | 12/1967 | Landin. | |
| 3,384,235 | 5/1968 | Schulze et al. | |

RALPH G. NILSON, Primary Examiner

M. J. FROME, Assistant Examiner

U.S. Cl. X.R.
250—106; 73—355

UNITED STATES PATENT OFFICE
CERTIFICATE OF CORRECTION

Patent No. 3,535,522  Dated October 20, 1970

Inventor(s) Edward Hart Green

It is certified that error appears in the above-identified patent and that said Letters Patent are hereby corrected as shown below:

Column 1, line 58, after "object" insert -- taken --. Column 2, line 53, "Lasser" should read -- Lesser --. Column 5, line 3, "linear" should read -- liner --.

Signed and sealed this 13th day of April 1971.

(SEAL)
Attest:

EDWARD M. FLETCHER, JR.
Attesting Officer

WILLIAM E. SCHUYLER, JR.
Commissioner of Patents